US012631573B2

(12) United States Patent
Takahara et al.

(10) Patent No.: US 12,631,573 B2
(45) Date of Patent: May 19, 2026

(54) X-RAY INSPECTION APPARATUS AND METHOD OF INSPECTION WITH X-RAYS

(71) Applicant: HITACHI HIGH-TECH ANALYSIS CORPORATION, Tokyo (JP)

(72) Inventors: Toshiyuki Takahara, Tokyo (JP); Tsuneo Sato, Tokyo (JP); Satoshi Matsubara, Tokyo (JP); Yuta Seki, Tokyo (JP); Kazuya Iwata, Tokyo (JP)

(73) Assignee: HITACHI HIGH-TECH ANALYSIS CORPORATION, Tokyo (JP)

( * ) Notice: Subject to any disclaimer, the term of this patent is extended or adjusted under 35 U.S.C. 154(b) by 174 days.

(21) Appl. No.: 18/137,910

(22) Filed: Apr. 21, 2023

(65) Prior Publication Data

US 2023/0384247 A1    Nov. 30, 2023

(51) Int. Cl.
G01N 23/083        (2018.01)
G01N 23/18          (2018.01)

(52) U.S. Cl.
CPC ........... G01N 23/083 (2013.01); G01N 23/18 (2013.01); *G01N 2223/313* (2013.01)

(58) Field of Classification Search
None
See application file for complete search history.

(56) References Cited

U.S. PATENT DOCUMENTS 6,556,652 B1 *    4/2003    Mazor .................. G01N 23/201
                                                       378/71
2010/0316187 A1 *  12/2010   Matoba ................ G01N 23/083
                                                       378/58

FOREIGN PATENT DOCUMENTS

JP            2010286406 B1      12/2010
JP            2019020123 A   *   2/2019
WO        WO-2011018840 A1 *    2/2011    ............. G01N 23/16

* cited by examiner

*Primary Examiner* — David J Makiya
*Assistant Examiner* — Miya Downing
(74) *Attorney, Agent, or Firm* — Holland & Hart LLP

(57)        ABSTRACT

Proposed are an X-ray inspection apparatus and a method of inspection with X-rays in which even in a sample having coated portion and uncoated portion of the cathode material, the inspection of foreign objects in the both portions can be simultaneously performed under the same conditions. The X-ray inspection apparatus includes an X-ray source (2) that irradiates the sample (S) with X-rays (X1), an X-ray detection unit (3) which is installed at a side opposite to the X-ray source with respect to the sample and detects the X-rays that passed through the sample, and a filter (4) installed between the X-ray source and the X-ray detection unit, wherein the sample has a region with a large amount of X-ray absorption and a region with a small amount of X-ray absorption.

7 Claims, 12 Drawing Sheets

X-RAY INSPECTION APPARATUS AND METHOD OF INSPECTION WITH X-RAYS

CROSS REFERENCE TO RELATED APPLICATION

The present application claims priority to Japan Patent Application No. 2022-88714, filed May 31, 2022, the entire contents of which are incorporated herein for all purposes by this reference.

BACKGROUND OF THE INVENTION

Field of the Invention

The present disclosure relates to an X-ray inspection apparatus and a method of inspection with X-rays in which a foreign object in a sample can be detected.

Description of the Related Art

For example, a battery member including a cathode material of a lithium ion secondary battery may smoke or catch fire due to a short circuit when metal foreign objects are introduced into cells of the battery member. Particularly, recently, as demand for high-capacity applications including BEVs increases, high energy densification is accelerating, and the prevention of introduction of metal foreign objects in a manufacturing process is becoming a major challenge.

In addition, the thickness of coating of the cathode material of the lithium ion secondary battery tends to increase to secure energy density, and to reduce the loss of a coated portion, intermittent coating has become a trend.

A short circuit by a metal foreign object is caused by a foreign object introduced into the cathode material and by a foreign object attached to an uncoated portion in contact with an electrolyte. Because of this, the introduction of a foreign object into the whole surface of the cathode material including the uncoated portion is required to be prevented.

Conventionally, the foreign object inspection of the coated portion and the uncoated portion has been performed by visible light appearance inspection, and only foreign objects attached to a surface could be detected. Furthermore, over-detection of non-metal foreign objects caused yield deterioration. In addition, in the visible light appearance inspection, a foreign object introduced into the cathode material cannot be detected, and thus the performing of output monitoring in an aging process after cell formation has been used as a substitute for the inspection, but in the case that there are defects, loss due to the defects is large.

Because of this, it is being considered to inspect for a foreign object in the coated portion and the uncoated portion by using an X-ray inspection apparatus.

For example, as an X-ray inspection apparatus that detects a foreign object in a sample to be measured, an X-ray transmission inspection apparatus is disclosed in Patent Document 1 in which a sample is irradiated with an X-ray from an X-ray source, and an X-ray detection unit receives the X-ray that passed through the sample to detect a foreign object through the intensity of the X-ray.

Documents of Related Art (Patent Document 1) Japan Patent Application Publication No. 2010-286406

SUMMARY OF THE INVENTION

The related art described above has the problems described below.

That is, in a conventional X-ray inspection apparatus, when a coated portion and an uncoated portion are imaged under the same conditions, a difference in contrast between X-rays penetrating the coated and uncoated portions is excessively large, resulting in incorrectly determining this as the presence of a foreign object. For example, as illustrated in FIG. 10, when foreign objects X are present in a cell-shaped electrode member EL having a coated portion P1 and an uncoated portion P0, distribution of luminance (intensity) of X-rays penetrating the coated portion P1 and the uncoated portion P0 in a line L1 passing over the foreign object X is obtained as illustrated in FIG. 11A. However, as illustrated in FIG. 11B, the difference in contrast between the X-rays penetrating the coated portion P1 and the uncoated portion P0 is excessively large, so it is incorrectly determined that foreign objects X are present in boundary over detection parts X0.

In addition, when measurement is performed under a condition under which the coated portion P1 can be inspected, a background difference between the coated portion P1 and the uncoated portion P0 is large, and as illustrated in FIG. 11A, the uncoated portion P0 is excessively bright, causing halation. In this case, as illustrated in FIG. 11B, the foreign object X of the coated portion P1 is detected, but the foreign object X of the uncoated portion P0 does not reach a threshold and is not detected. Accordingly, the foreign object X in the uncoated portion P0 is underestimated. Because of this, in order to detect the foreign object X in the uncoated portion P0, measurement is required to be performed again by changing the voltage of the X-ray source, which is troublesome.

The present disclosure is made in view of the above-described problems, and is intended to propose an X-ray inspection apparatus and a method of inspection with X-rays in which even in a sample having the coated portion and the uncoated portion of the cathode material, the inspection of foreign objects in the both portions can be simultaneously performed under the same conditions.

The present disclosure employs the following configurations to solve the above problems. That is, an X-ray inspection apparatus according to a first invention includes: an X-ray source that irradiates a sample with X-rays; an X-ray detection unit which is installed on a side opposite to the X-ray source with respect to the sample and detects the X-rays that passed through the sample; and a filter installed between the X-ray source and the X-ray detection unit, wherein the sample has a region with a large amount of X-ray absorption and a region with a small amount of X-ray absorption, and the filter is formed of a material that makes an intensity ratio between an X-ray that passed through the region with a small amount of X-ray absorption and an X-ray that passed through the region with a large amount of X-ray absorption X smaller than when the filter is not installed.

In the X-ray inspection apparatus, the filter is formed of a material that makes the intensity ratio between an X-ray that passed through a region with a small amount of X-ray absorption and an X-ray that passed through a region with a large amount of X-ray absorption smaller than when the filter is not installed. Accordingly, difference in contrast between the region with a large amount of X-ray absorption and the region with a small amount of X-ray absorption decreases to restrain boundary over detection so that incorrect determination that a foreign object is present due to the boundary over detection can be prevented. Additionally, even in measurement under a condition suitable for the region with a large amount of X-ray absorption, halation of the region with a small amount of X-ray absorption can be prevented, and underestimation of foreign objects can be prevented. Accordingly, in the X-ray inspection apparatus of the embodiment, simultaneous inspection of foreign objects under the same conditions can be performed even in the sample of a conventional technology in which difference in contrast between X-rays penetrating the sample is excessively large and simultaneous inspection of foreign objects in the sample cannot be performed.

An X-ray inspection apparatus according to a second invention features that in the first invention, the sample has a region with a large amount of X-ray absorption and a region with a small amount of X-ray absorption in a specific energy band of the X-rays with which the sample is irradiated, and the filter is formed of a material that makes absorption of X-rays of the specific energy band greater than absorption of X-rays of other energy bands.

That is, in the X-ray inspection apparatus, the filter is formed of a material that makes absorption of X-rays of a specific energy band greater than X-rays of other energy bands. Accordingly, more X-rays that passed through the region with a small amount of X-ray absorption in the specific energy band may be absorbed by the filter, so an energy distribution difference between the X-rays that passed through the region with a large amount of X-ray absorption and the region with a small amount of X-ray absorption may decrease to decrease a difference in contrast therebetween.

In addition, when a specific energy band of X-rays is a low-energy component, a large amount of low-energy X-rays are absorbed and attenuated by the filter, thereby restraining generation of ozone due to the activation of oxygen in the air, and restraining deterioration due to oxidation of device structures, etc.

An X-ray inspection apparatus according to a third invention features that in the first or second invention, the sample has an uncoated portion that is a region where the base material is exposed and an amount of X-ray absorption is small, and a coated portion that is a region where a material different from the base material is applied on the base material and an amount of X-ray absorption is large.

That is, in the X-ray inspection apparatus, since the sample has the uncoated portion that is the region where the base material is exposed and the amount of X-ray absorption is small, and the coated portion that is a region where the material different from the base material is applied on the base material and the amount of X-ray absorption is large, foreign objects in the uncoated portion and the coated portion can be inspected simultaneously. For example, when the base material is a cathode current collector of a lithium ion secondary battery, and a material different from the base material is the cathode material member of the lithium ion secondary battery which is the cathode material of the lithium ion secondary battery, foreign objects in the coated portion to which the cathode material is applied and foreign objects in the uncoated portion to which the cathode material is not applied can be inspected simultaneously.

An X-ray inspection apparatus according to a fourth invention features that in the first or second invention, the sample is of a flexible film shape, and the filter is placed in close contact with the sample by being located between the X-ray source and the X-ray detection unit.

That is, in the X-ray inspection apparatus, since the filter is placed in close contact with the sample by being located between the X-ray source and the X-ray detection unit, in addition to the reduction effect of the difference in contrast, the filter has a function of correcting the bending of the sample, and thus the imaging of foreign objects may be performed more accurately. Accordingly, the reduction of the difference in contrast and the correction of the bending, etc. can be realized by the filter which is a common single member, thereby reducing costs of the apparatus.

An X-ray inspection apparatus according to a fifth invention features that in the fourth invention, the filter is placed on each of both surfaces of the sample, with the sample being in between.

That is, in the X-ray inspection apparatus, since the filter is placed on each of the both surfaces of the sample with the sample being in between, the sample is inserted between the filters to be sandwiched therebetween, and thus the bending, sagging, or curving of the sample is corrected so that the imaging of a foreign object can be performed more accurately.

An X-ray inspection apparatus according to a sixth invention features that the X-ray inspection apparatus in the fourth invention further includes: a sample moving mechanism that continuously moves the sample of a band shape in an extension direction of the sample, wherein the sample moving mechanism is provided with a roller member rotatable while the sample is in contact with a portion of an outer circumferential surface of the roller member, the X-ray source is disposed inside or outside the roller member, the X-ray detection unit is installed on the side opposite to the X-ray source with respect to a portion of the sample in contact with the outer circumferential surface of the roller member, and the roller member is the filter.

That is, in the X-ray inspection apparatus, the sample moving mechanism may include the roller member rotatable while the sample is in contact with a portion of the outer circumferential surface of the roller member, and the roller member may be a filter. Accordingly, in addition to the reduction of the difference in contrast, while the bending, sagging, or curving of the sample is corrected by the roller member, the sample having a band shape may be continuously moved in the extension direction of the sample so that the imaging of the foreign object can be performed continuously and accurately. Particularly, the bending of even a sample having the shape of a long roll which moves continuously may be corrected by the roller member which is a free roller so that the inspection of a foreign object can be performed continuously.

A method of inspection with X-rays according to a seventh invention includes: irradiating a sample with X-rays from an X-ray source; and detecting the X-rays that passed through the sample with an X-ray detection unit installed on a side opposite to the X-ray source with respect to the sample, wherein a filter is installed between the X-ray source and the X-ray detection unit, the sample has a region with a large amount of X-ray absorption and a region with a small amount of X-ray absorption, and the filter is formed of a material that makes an intensity ratio between an X-ray that passed through the region with a small amount of X-ray absorption and an X-ray that passed through the region with a large amount of X-ray absorption smaller than when the filter is not installed.

According to the present disclosure, the following effects are obtained.

That is, according to the X-ray inspection apparatus and the method of inspection with X-rays according to the present disclosure, the filter is formed of a material that makes an intensity ratio between an X-ray that passed through the region with a small amount of X-ray absorption and an X-ray that passed through the region with a large amount of X-ray absorption smaller than when the filter is not installed, and thus even in a sample in which difference in contrast between the penetrating X-rays is excessively large and simultaneous inspection of foreign objects cannot be performed, it is possible to simultaneously inspect foreign objects under the same conditions.

Accordingly, according to the X-ray inspection apparatus and the method of inspection with X-rays of the present disclosure, for example, in a lithium ion battery, even in the cathode material member having the coated portion and the uncoated portion of the cathode material, foreign matters in both the coated portion and the uncoated portion can be simultaneously inspected with high detection accuracy.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Hereinafter, a first embodiment of an X-ray inspection apparatus and a method of inspection with X-rays according to the present disclosure will be described with reference to FIGS. 1 to 3.

Figure 1:
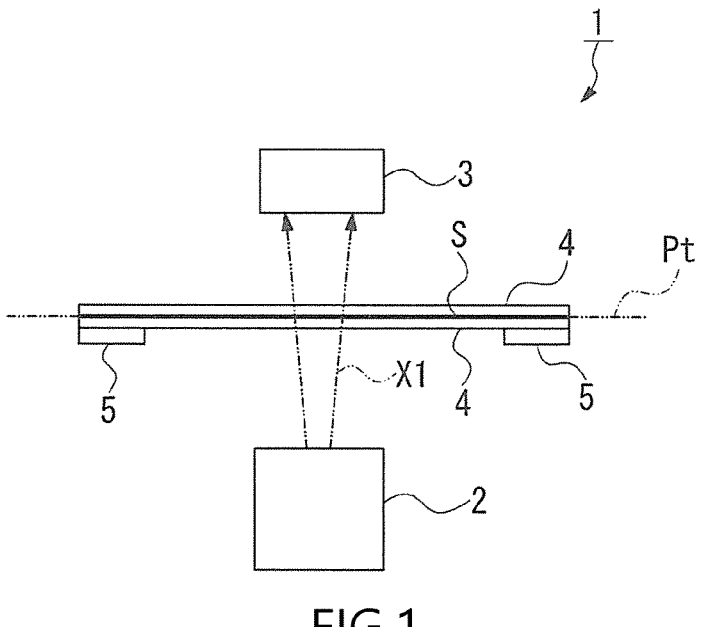
FIG. 1 is a schematic diagram illustrating an X-ray inspection apparatus in a first embodiment of the X-ray inspection apparatus and a method of inspection with X-rays according to the present disclosure.

As illustrated in FIG. 1, the X-ray inspection apparatus 1 of the embodiment includes an X-ray source 2 that irradiates the sample S with an X-ray X1, an X-ray detection unit 3 which is installed on a side opposite to the X-ray source 2 with respect to the sample S and detects an X-ray X1 that passed through the sample S, and a filter 4 installed between the X-ray source 2 and the X-ray detection unit 3.

The sample S has the region P1 with a relatively large amount of X-ray absorption, and the region P0 with a relatively small amount of X-ray absorption.

In the embodiment, the sample S has the region P1 with a large amount of X-ray absorption and the region P0 with a small amount of X-ray absorption in a specific energy band among irradiated X-rays X1.

For example, the sample S has an uncoated portion (hereinafter, the reference numeral of the uncoated portion is P0) that is a region where the base material is exposed and an amount of X-ray absorption is small, and a coated portion (hereinafter, the reference numeral of the coated portion is P1) that is a region where a material different from the base material is applied on the base material and an amount of X-ray absorption is large.

Specifically, the sample S of the embodiment is a cathode material member of a lithium ion secondary battery having an uncoated portion P0 which is a cathode current collector (for example, aluminum, etc.) of the lithium ion secondary battery as a base material, and a coated portion P1 which is a cathode material of the lithium ion secondary battery which is a material different from the base material.

The filter 4 is formed of a material that makes the intensity ratio between an X-ray X1 that passed through a region (the uncoated portion) P0 with a small amount of X-ray absorption and an X-ray X1 that passed through a region (the coated portion) P1 with a large amount of X-ray absorption smaller than when the filter 4 is not installed.

That is, the filter 4 of the embodiment is preferably a filter formed of a material that absorbs an X-ray X1 of a specific energy band more than an X-ray X1 of another energy band by corresponding to the sample S.

For example, when the area P1 with a large amount of X-ray absorption is the coated portion which is the cathode material of the lithium ion secondary battery, the cathode material is a material (for example, Lithium cobaltate ($LiCoO_2$), etc.) which absorbs an X-ray X1 of a lower energy zone (particularly, 5 keV-12 keV) more than an X-ray X1 of another energy zone (an energy zone above 12 keV).

The filter 4 is formed of, for example, CFRP, light metal, or metal foil, etc.

The sample S is of a flexible film shape, and the filter 4 is placed in close contact with the sample S by between the X-ray source 2 and the X-ray detection unit 3.

That is, the filter 4 is placed on each of the both surfaces of the sample S with the sample S being in between.

Figure 10:
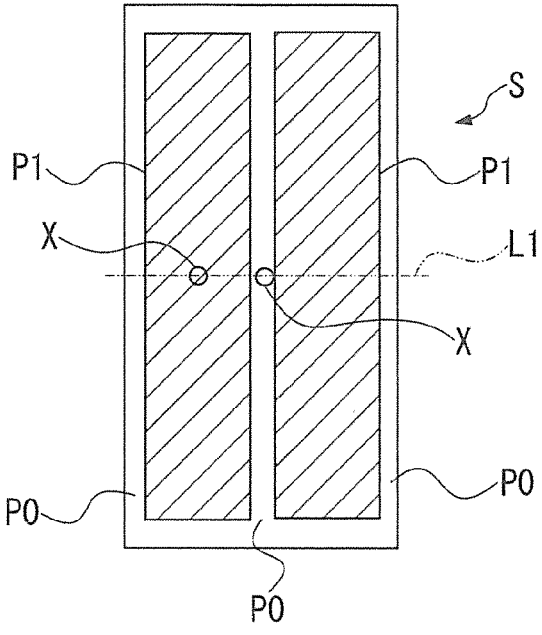
FIG. 10 is a top plan view of the sample of an electrode member having the coated portion and uncoated portion of the cathode material.

As illustrated in FIG. 10, the sample S which is an electrode member cut into a cell shape has upper and lower portions sandwiched between one pair of filters 4 as illustrated in FIG. 1. While the sample S maintains a flat shape, the sample S is mounted on a sample support 5 to perform the X-ray inspection of the sample S.

Figure 12:
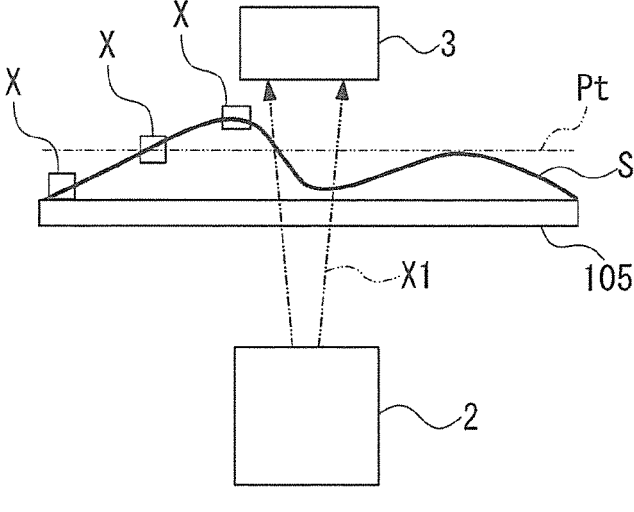
FIG. 12 is a schematic diagram illustrating the X-ray inspection apparatus in a case in which bending, sagging, or curving occurs in a sample in a conventional example of the X-ray inspection apparatus and the method of inspection with X-rays according to the present disclosure.

In addition, as illustrated in FIG. 10, the electrode member (the sample S) cut into a cell shape has the shape of a sheet and thus may be bent, sagged, or curved in units of several tens of mm. In this state, when the X-ray transmission inspection of the sample S is performed, the imaging of a foreign object X in the sample S may not be performed accurately. For example, as illustrated in FIG. 12, an X-ray source 2 and an X-ray detection unit 3 are disposed to face each other with a sample support 105 placed therebetween, and when the sample S is bent or sagged when inspecting a foreign object in the sample S by mounting the sample S of the electrode member on the sample support 105, the foreign object X in the sample S deviates from the focus Pt of the X-ray detection unit 3.

Figure 8:
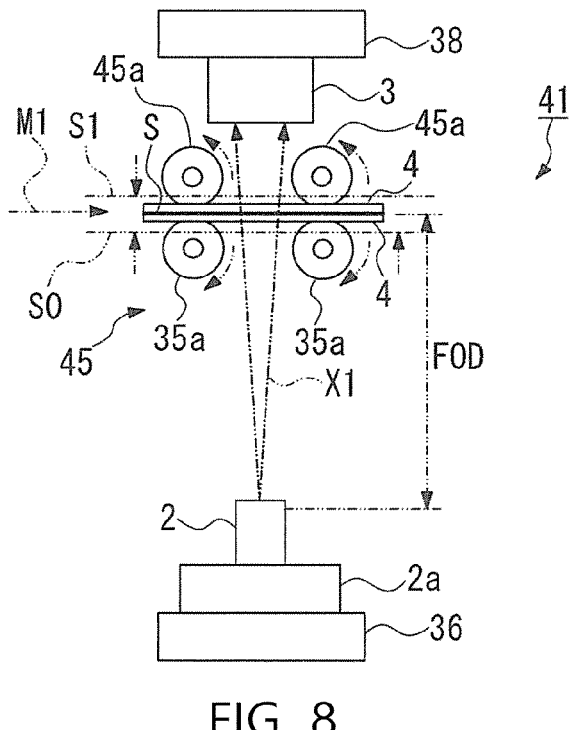
FIG. 8 is a schematic configuration diagram illustrating the X-ray inspection apparatus viewed from another side in a fourth embodiment.
Figure 13A:
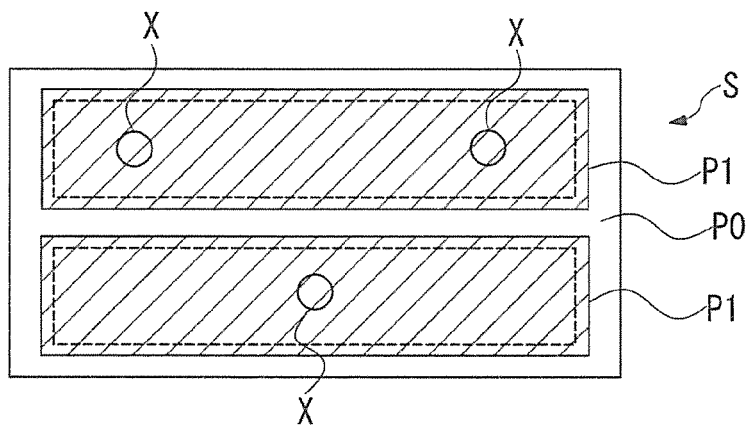
FIG. 13A is a top plan view of the sample of the electrode member having the bending illustrated FIG. 12.
Figure 13B:
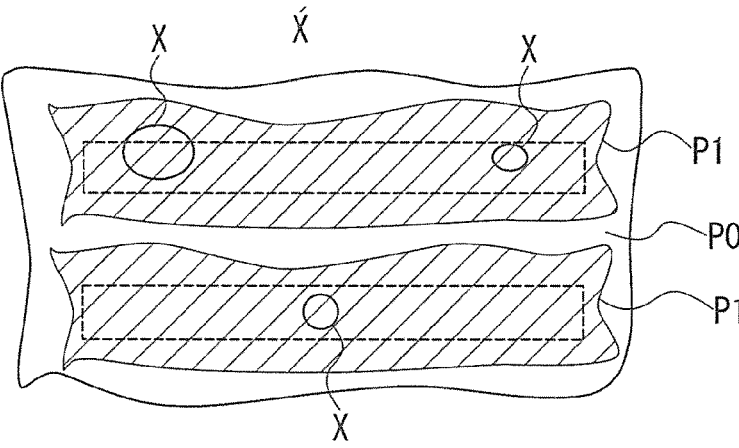
FIG. 13B is a conceptual image taken with a conventional X-ray inspection apparatus.

For example, when the sample S bends or sags as illustrated in FIG. 8 when the sample S viewed from the upper side has a foreign object X as illustrated in FIG. 13A, positional dependence of optical magnification occurs as illustrated in FIG. 13B, and thus correlation between the size and detection rate of the foreign object is reduced or an inspection range thereof is reduced due to change in the number of pixels for a work size or coating width. In addition, there is a restriction in a conveying Z-axis (thickness direction), so defocusing may be increased. Additionally, blurring in a conveying direction occurs due to disagreement with a focus position. That is, because of these, the foreign object may be detected larger than an actual size thereof.

In addition, when sagging or curving occurs, positional dependence of the amount of X-ray absorption occurs, and the length of the optical path of an X-ray differs depending on a position, and thus a correlation between the size and detection rate of a foreign object is reduced, or the risk of over-detection is increased.

In order to solve these problems, in the embodiment, the sample S is inserted between one pair of filters 4 to be sandwiched therebetween so that the bending of the sample can be corrected.

In addition, the focus Pt of the X-ray detection unit 3 matches the height position of the sample S which has been flattened by being sandwiched between the pair of filters 4.

The X-ray source 2, which is an X-ray lamp that can emit an X-ray X1, emits the X-ray X1 as a primary X-ray from a window such as a beryllium foil, the X-ray X1 being generated in such a manner that thermal electrons generated from a filament (a negative pole) in the lamp are accelerated by a voltage applied between the filament (the negative pole) and a target (a positive pole) and collide with W (tungsten), Mo (molybdenum), and Cr (chrome) of the target.

The X-ray detection unit 3 has a plurality of rows of line sensors along a specific direction so that pixels are arranged in a matrix shape, a TDI sensor (not shown) which is a X-ray detection unit which detects the X-ray X1 that passed through the sample S by the pixels, and a line sensor calculation part (not shown) which controls the accumulation and transfer of charges in the plurality of pixels along the specific direction.

In addition, the X-ray inspection apparatus 1 of the embodiment includes a control part (not shown) which controls each of the parts, a display part (not shown) for displaying information such as a transmission image, and a sample moving mechanism (not shown) which moves the sample S in a specific direction, such as a motor, during the irradiation of the X-ray X1 from the X-ray source 2.

As described above, the sample S of the embodiment is a sheet of the electrode member used in the lithium ion secondary battery, but may be, for example, a material of a fuel cell formed in a strip shape, a gas diffusion layer, carbon paper, or a material of a long sheet shape used in pharmaceuticals.

In addition, when the sample S is an electrode sheet used in the lithium ion secondary battery, a metal foreign object X introduced therein is assumed to be, for example, Fe or SUS.

The method of inspection with X-rays in which the X-ray inspection apparatus 1 of the embodiment is used will be described.

The method of inspection with X-rays of the embodiment includes irradiating the sample S with the X-ray X1 from the X-ray source 2, and detecting the X-ray X1 that passed through the sample S by the X-ray detection unit 3 installed on a side opposite to the X-ray source 2 with respect to the sample S. In this case, since the filter 4 is installed between the X-ray source 2 and the X-ray detection unit 3, as illustrated in FIG. 2, the intensity ratio of an X-ray X1 that passed through the area P0 with the small amount of X-ray absorption (P0) to the X-ray X1 that passed through the area P1 with the large amount of X-ray absorption decreases, compared to when the filter 4 is not installed.

Figure 3A:
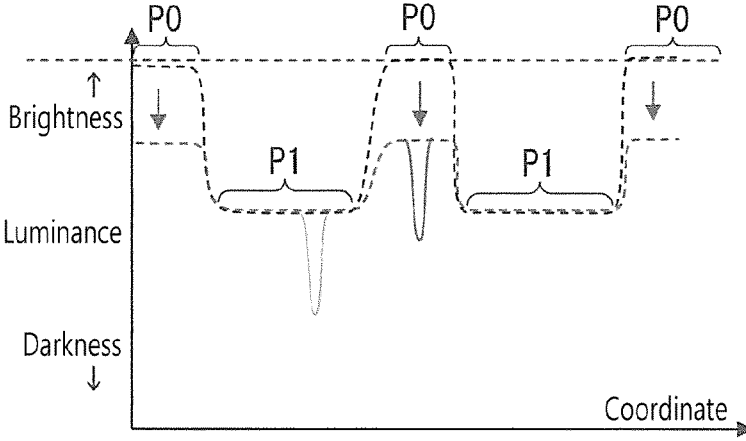
FIG. 3A is a graph illustrating luminance distribution of X-rays that passed through a sample of FIG. 10 in the first embodiment.
Figure 3B:
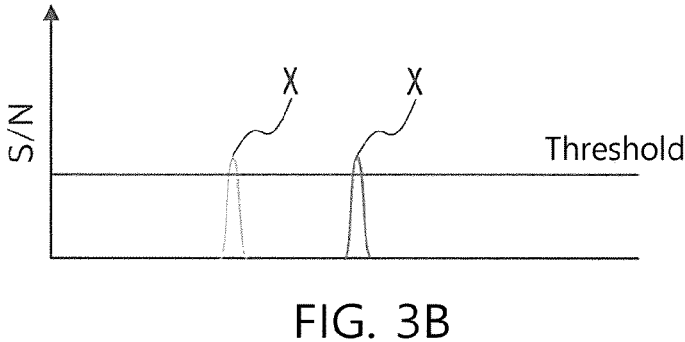
FIG. 3B is a graph illustrating corresponding SN (a contrast ratio)
Figure 4:
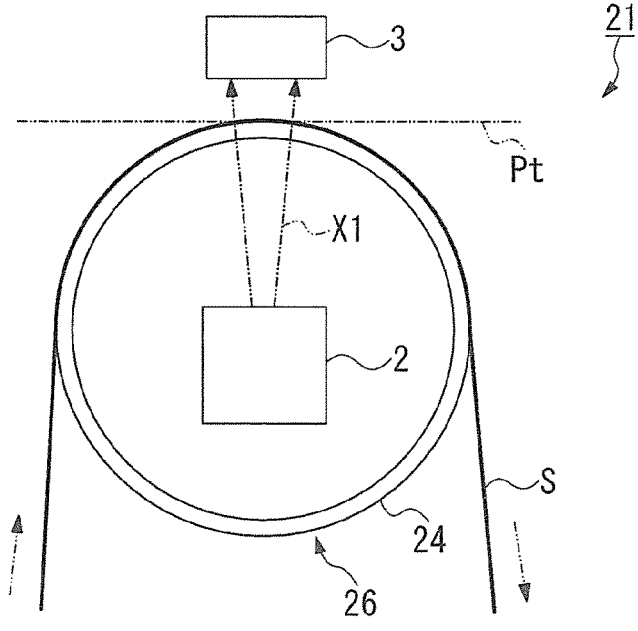
FIG. 4 is a schematic diagram illustrating an X-ray inspection apparatus in a second embodiment of the X-ray inspection apparatus and the method of inspection with X-ray according to the present disclosure.
Figure 11A:
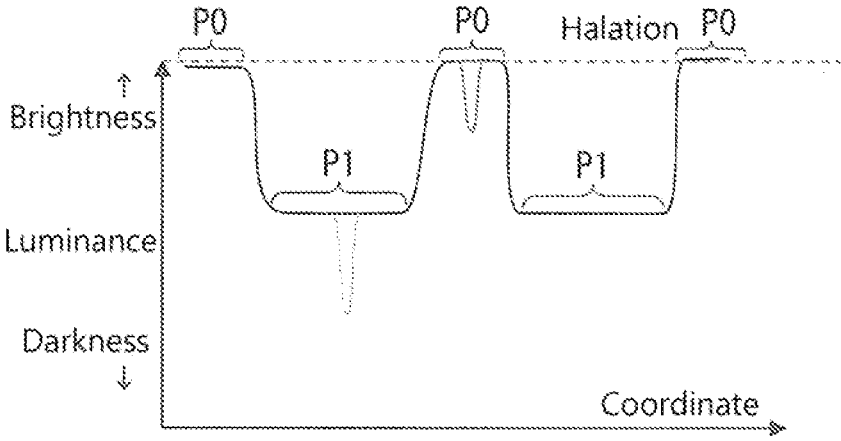
FIG. 11A is a graph illustrating luminance distribution of X-rays that passed through the sample of FIG. 10 in a conventional example of the X-ray inspection apparatus and the method of inspection with X-rays according to the present disclosure.
Figure 11B:
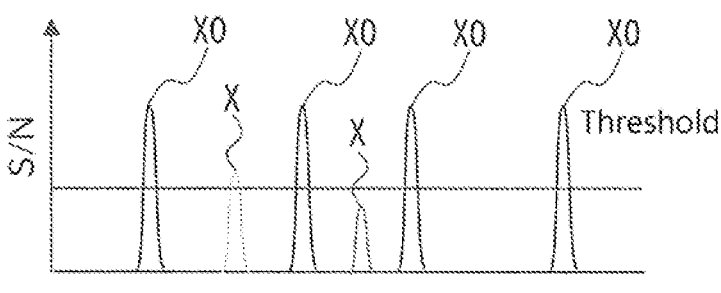
FIG. 11B is a graph illustrating corresponding SN (a contrast ratio)

For example, as illustrated in FIG. 10, when foreign objects X are present in the cell-shaped electrode member EL having the coated portion P1 and the uncoated portion P0, the distribution of the luminance (intensity) of X-rays X1 penetrating the coated portion P1 and the uncoated portion P0 in a line L1 passing over the foreign object X is obtained as illustrated in FIG. 3A. In this case, as illustrated in FIG. 3B, difference in contrast between the X-rays X1 penetrating the coated portion P1 and the uncoated portion P0 is smaller than difference in contrast between the X-rays in FIG. 11B. Accordingly, it is not determined that foreign objects X are present in boundary over detection parts, but a foreign object X present in the coated portion P1 and a foreign object X present in the uncoated portion P0 exceed a threshold and are simultaneously determined as foreign objects X.

Accordingly, in the X-ray inspection apparatus 1 of the embodiment, the filter 4 is formed of a material that makes the intensity ratio between an X-ray X1 that passed through the region P0 with a small amount of X-ray absorption and an X-ray X1 that passed through the region P1 with a large amount of X-ray absorption smaller than when the filter 4 is not installed, and thus difference in contrast between the region P1 with a large amount of X-ray absorption and the region P0 with a small amount of X-ray absorption decreases to retrain boundary over detection so that incorrect determination that a foreign object X is present due to the boundary over detection can be prevented.

In addition, even in measurement under a condition suitable for the region P1 with a large amount of X-ray absorption, halation of the region P0 with a small amount of X-ray absorption can be prevented, and underestimation of foreign objects X can be prevented. Accordingly, in the X-ray inspection apparatus 1 of the embodiment, simultaneous inspection of foreign objects under the same conditions can be performed even in the sample S of a conventional technology in which difference in contrast between X-rays X1 penetrating the sample S is excessively large and simultaneous inspection of foreign objects cannot be performed.

In addition, the filter 4 is formed of a material which absorbs more X-rays X1 of a specific energy band than X-rays X1 of another energy band. Accordingly, more X-rays X1 that passed through the region P0 with a small amount of X-ray absorption in the specific energy band may be absorbed by the filter 4, so energy distribution difference between the X-rays X1 that passed through the region P1 with a large amount of X-ray absorption and through the region P0 with a small amount of X-ray absorption decreases to decrease difference in contrast therebetween.

Particularly, when the sample S has the uncoated portion P0 that is a region where the base material is exposed and an amount of X-ray absorption is small, and the coated portion P1 that is a region where a material different from the base material is applied on the base material and an amount of X-ray absorption, foreign objects in the uncoated portion P0 and the coated portion P1 can be inspected simultaneously. For example, when the base material is a cathode current collector of a lithium ion secondary battery and a material different from the base material is the cathode material member of a lithium ion secondary battery, which is the cathode material of the lithium ion secondary battery, foreign objects in the coated portion P1 to which the cathode material is applied, and foreign objects in the uncoated portion P0 to which the cathode material is not applied can be inspected simultaneously.

In addition, the filter 4 is placed in close contact with the sample between the X-ray source 2 and the X-ray detection unit 3. Accordingly, in addition to the reduction of the difference in contrast, the filter 4 has a function of correcting the bending of the sample S, so the imaging of the foreign object X can be performed more accurately. Accordingly, the reduction of the difference in contrast, and the correction of the bending can be realized by the filter 4 which is a common single member, thereby reducing costs of the apparatus.

Particularly, the filters 4 are disposed respectively on the opposite surfaces of the sample S with the sample S placed between the filters 4. Accordingly, the sample S is sandwiched between the filters 4, and thus the bending, sagging, or curving of the sample S is corrected, so the imaging of the foreign object X can be performed more accurately.

Next, the second to fourth embodiments of the X-ray inspection apparatus and the method of inspection with X-rays according to the present disclosure will be described below with reference to FIGS. 4 to 8. In addition, in description of each embodiment below, the same component described in the above embodiment is given the same reference numeral, and description thereof will be omitted.

Figure 2A:
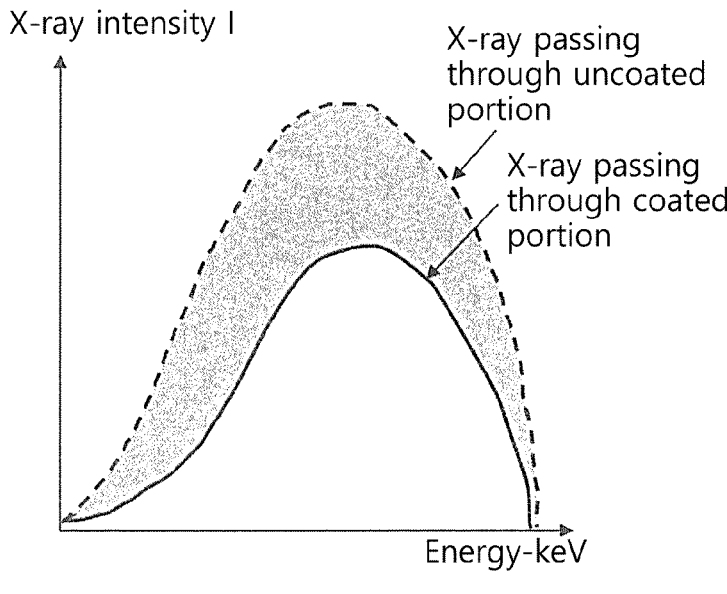
FIGS. 2A and 2B are graphs of energy intensity of X-rays that passed through a coated portion and an uncoated portion compared with each other according to whether the filter is present in the first embodiment.
Figure 2B:
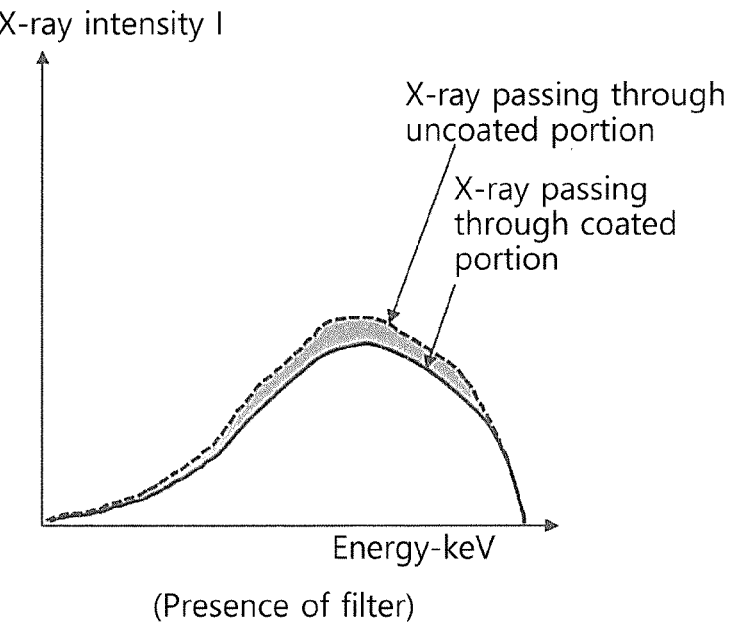

As for difference between the second embodiment and the first embodiment, in the first embodiment, the sample S wh8ich is the electrode member cut into a cell shape is inserted between one pair of filers 4, and while the sample S is in the shape of a flat plate, the sample S is mounted on the sample support 5 to perform the X-ray inspection, whereas as illustrated in FIG. 2, an X-ray inspection apparatus 21 of the second embodiment is provided with the sample moving mechanism 26 that continuously moves the sample S having the shape of a long band in an extension direction of the sample S.

The sample moving mechanism 26 is provided with a roller member 24 rotatable while the sample S is in contact with a portion of an outer circumferential surface of the roller member 24.

The X-ray source 2 is disposed inside or outside the roller member 24, and the X-ray detection unit 3 is installed on a side opposite to the X-ray source 2 with respect to a portion of the sample S in contact with the outer circumferential surface of the roller member 24. In addition, in the embodiment, the X-ray source 2 is disposed inside the roller member 24.

In addition, the roller member 24 is a filter described above. That is, the roller member 24 is formed in a cylindrical shape with the same material as the filter 4 of the first embodiment.

In addition, for example, the sample moving mechanism 26 has components such as a plurality of rollers or motors capable of moving the long sample S in a roll-to-roll type in the extension direction of the sample S, and the roller member 24 is rotatably supported by a shaft member which is not shown. Accordingly, when the sample S moves in the extension direction, the roller member 24, which is the filter, having a portion of the outer circumferential surface thereof in contact with the sample S also rotates.

Furthermore, as for the electrode member having a long band shape, when the electrode member installed between the rolls of a roll-to-roll type is simply irradiated with an X-ray and inspected, the electrode member of a sheet shape extended by being installed between the rolls sags due to weight of the electrode member, and thus it is difficult to accurately perform the imaging of a foreign object.

However, the X-ray inspection apparatus 21 of the second embodiment is provided with the roller member 24 rotatable while the sample S is in contact with a portion of the outer circumferential surface of the roller member 24, and the roller member 24 is formed as the filter. Accordingly, in addition to the reduction of the difference in contrast, while the bending, sagging, or curving of the sample S is corrected, the sample S of a band shape is continuously moved in the extension direction of the sample S so that the imaging of a foreign object X can be performed continuously and accurately. Particularly, even if the sample S has the shape of a long roll that continuously moves, the bending of the sample S is corrected by the roller member 24 which is a free roller so that the inspection of the foreign object X can be performed continuously.

Figure 5:
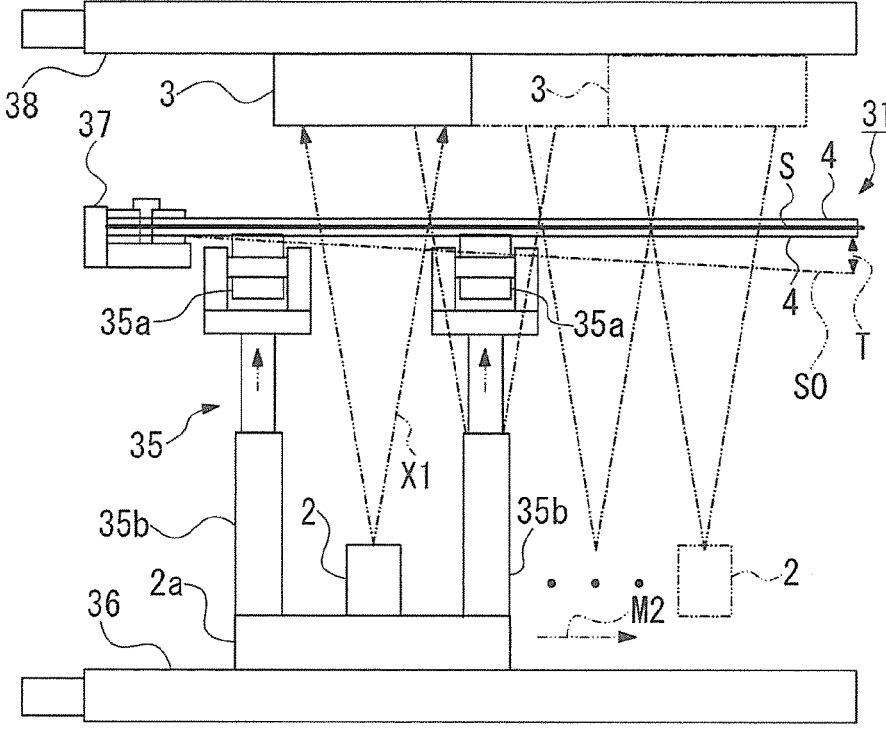
FIG. 5 is a schematic configuration diagram illustrating an X-ray inspection apparatus viewed from a side in a third embodiment of the X-ray inspection apparatus and the method of inspection with X-rays according to the present disclosure.
Figure 6:
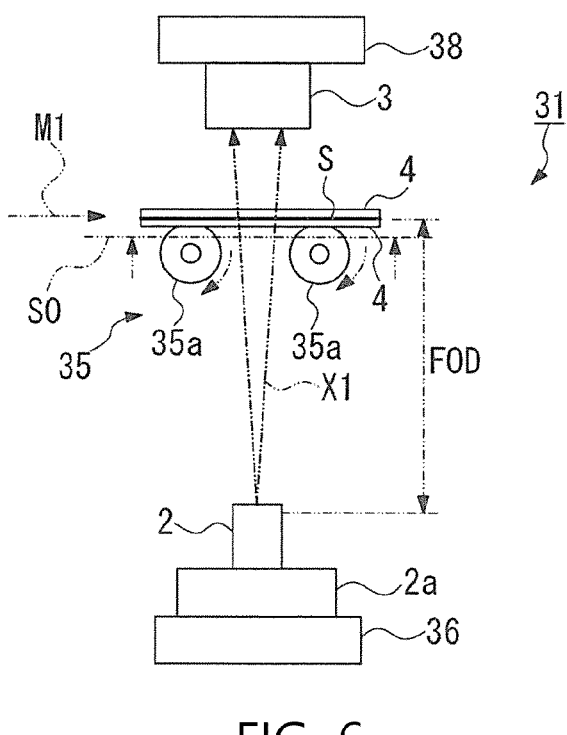
FIG. 6 is a schematic configuration diagram illustrating the X-ray inspection apparatus viewed from another side in the third embodiment.

Next, as for difference between a third embodiment and the first embodiment, the sample S is inserted and supported between the filters 4 which are one pair of flat plates, whereas as illustrated in FIGS. 5 and 6, an X-ray inspection apparatus 31 of the third embodiment is provided with a filter support part 35 which supports the filters 4 by leveling at least a portion of the filters 4 disposed between the X-ray source 2 and the X-ray detection unit 3.

That is, the X-ray inspection apparatus 31 of the third embodiment includes the filter support part 35 such that at least a portion of the sample S inserted between one pair of filters 4 and disposed between the X-ray source 2 and the X-ray detection unit 3 has a distance constant from the X-ray source 2.

The X-ray inspection apparatus 31 is provided with the moving mechanism which can relatively move the sample S, the X-ray source 2, and the X-ray detection unit 3, and the filter support part 35 is preset to support the filters 4 having the shapes of flat plates by constantly leveling the filters when irradiating the sample S with the X-ray X1 when the sample S is moved.

The filter support part 35 has the function of allowing at least a portion of the sample S inserted between the pair of filters 4 and disposed between the X-ray source 2 and the X-ray detection unit 3 to be located at a constant distance from the X-ray source 2.

The filter support part 35 includes four sagging restraining rollers 35*a* disposed around an X-ray irradiation portion ranging from the X-ray source 2 to the X-ray detection unit 3, and four extendable shaft members 35*b* on which the sagging restraining rollers 35*a* are disposed.

Each of the extendable shaft members 35*b* is installed standing around the X-ray source 2 on a support 2*a* of the X-ray source 2.

The extendable shaft member 35*b* is a member capable of extending in such a manner that a piston part protrudes upward from a cylinder part by hydraulic pressure for example.

The support 2*a* is mounted on an X-axis stage 36 of the X-ray source side and can be moved toward an extension direction M2 by the X-axis stage 36 of the X-ray source side.

In addition, the X-ray detection unit 3 is mounted to the lower surface of an X-axis stage 38 of a detection part side, and can be moved toward the extension direction M2 by the X-axis stage 38 of the detection part side. Additionally, the X-axis stage 36 of the X-ray source side and the X-axis stage 38 of the detection part side can move the support 2*a* and the X-ray detection unit 3 at the same pitch by operating in cooperation with each other.

Furthermore, a Y-axis stage (not shown) as a mechanism which moves the sample S in the width direction M1 of the sample S is arranged by extending in a direction orthogonal to the X-axis stage 36 of the X-ray source side and the X-axis stage 38 of the detection part side. The sample support (not shown) of the sample S is fixed to the Y-axis stage, and the sample S can be moved in the width direction M1 by the Y-axis stage.

The sagging restraining roller 35*a* has a rotating shaft in the extending direction of the sample S and is rotatably shaft-supported.

As in the first embodiment, the sample S is in a sandwiched state in which the upper and lower surfaces of the sample S are sandwiched by the pair of filters 4, and is formed longer than the sample of the first embodiment. In addition, a first end portion of the sample S and the filters 4 is fixed by an end support part 37, but a second end portion thereof is open.

When the X-ray inspection apparatus 31 performs the X-ray inspection of the sample S, the lower surface of a first end side of the sample S is supported by the four sagging restraining rollers 35*a* while the first end portion of the sample S sandwiched by the pair of filters 4 is first fixed by the end support part 37. In this case, the four extendable shaft members 35*b* preset the height positions of the sagging restraining rollers 35*a* so that the sample S, which is about to sag due to weight, is horizontal.

That is, a distance FOD between the focal point of the X-ray source 2 and the work pass line of the sample S is preset by the filter support part 35 so that the distance has a normal value without the sagging of the sample S.

In addition, in a case in which the sample S and the support bodies 4 are not supported by the filter support part 35, since the sample S is long, the sample S is in a state S0 sagged downward by a sagging amount T at a second end side thereof due to weight of the sample S even though the sample S is inserted between the filters 4 as illustrated in FIG. 5.

As illustrated in FIG. 6, while the sample support and the sample S are moved in the width direction M1 by the Y-axis stage in a state in which the sample S and the filters 4 are supported by the filter support part 35, the X-ray X1 scans the sample S to perform the X-ray inspection of the sample S in the width direction M1. In this case, while rotating, one pair of sagging restraining rollers 35*a* supports the sample S inserted between the filters 4, and thus the sample S can be inspected without sagging.

In addition, as illustrated in FIG. 5, while the X-axis stage 36 of the X-ray source side and the X-axis stage 38 of the detection part side move the support 2*a* and the X-ray detection unit 3 at a predetermined pitch along the extension direction M2 of the sample S, the X-ray inspection of the sample S in the width direction M1 is performed, so the X-ray inspection of the long sample S can be performed while the long sample S is restrained from sagging.

Furthermore, in the X-ray inspection apparatus 31, in addition to the long sample S, the sample S using a large substrate can be restrained from bending or sagging due to weight of the sample S.

Additionally, in the present disclosure, the four sagging restraining rollers 35*a* and the four extendable shaft members 35*b* are employed, but for example, two sagging restraining rollers 35*a* and two extendable shaft members 35*b* may constitute the filter support part 35.

Figure 7:
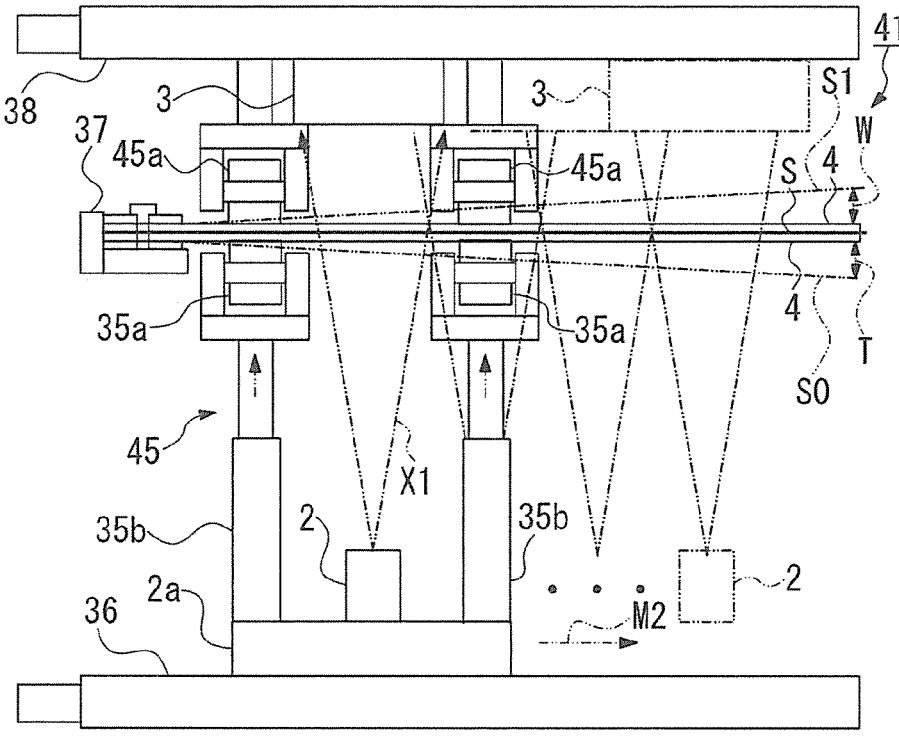
FIG. 7 is a schematic configuration diagram illustrating an X-ray inspection apparatus viewed from a side in a fourth embodiment of the X-ray inspection apparatus and the method of inspection with X-rays according to the present disclosure.

Next, as for difference between the fourth embodiment and the third embodiment, in the third embodiment, the lower surfaces of the sample S and the filter 4 are supported by the filter support part 35 to restrain the sagging of the sample S, whereas in an X-ray inspection apparatus 41 of the fourth embodiment, as illustrated in FIGS. 7 and 8, the upper surfaces of the sample S and the filter 4 are supported by the filter support part 45.

That is, the filter support part 45 of the fourth embodiment includes four sagging restraining rollers 35*a* which press and support the sample S and the filter 4 by being in contact with the lower surface of the filter 4, and four bending restraining rollers 45*a* which support the sample S and the filter 4 by being in contact with the upper surface of the filter 4.

Each of the bending restraining rollers 45*a* is fixed to and hanging from the X-axis stage 38 of the detection part side or the X-ray detection unit 3 at the upper part of the bending restraining roller 45*a*. In addition, the bending restraining rollers 45*a* are disposed directly above corresponding sagging restraining rollers 35*a*, respectively. That is, the sample S and the filter 4 are sandwiched by the sagging restraining rollers 35*a* and the bending restraining rollers 45*a*, respectively, from the lower and upper side.

Like the sagging restraining roller 35*a*, the bending restraining roller 45*a* has a rotating shaft in the extension direction of the sample S and is rotatably shaft-supported.

When the X-ray inspection apparatus 41 performs the X-ray inspection of the sample S, the lower surface of the sample S is first supported by the four sagging restraining rollers 35*a*, and the upper surface of the sample S is supported by the four bending restraining rollers 45*a*.

In addition, when the sample S and the filter 4 are not supported by the bending restraining roller 45*a*, the sample S may be in a bent state 51 by a bending amount W at the second end side thereof as illustrated in FIG. 7, but the bending restraining roller 45*a* may support the sample S and the filter 4 to correct the bending of the sample S which cannot be completely corrected by only the filter 4.

Furthermore, the X-ray inspection apparatus of the present disclosure employs four bending restraining rollers 45a, but may use two bending restraining rollers 45a instead of the four bending restraining rollers 45a to constitute the filter support part 45.

EMBODIMENT

Figure 9A:
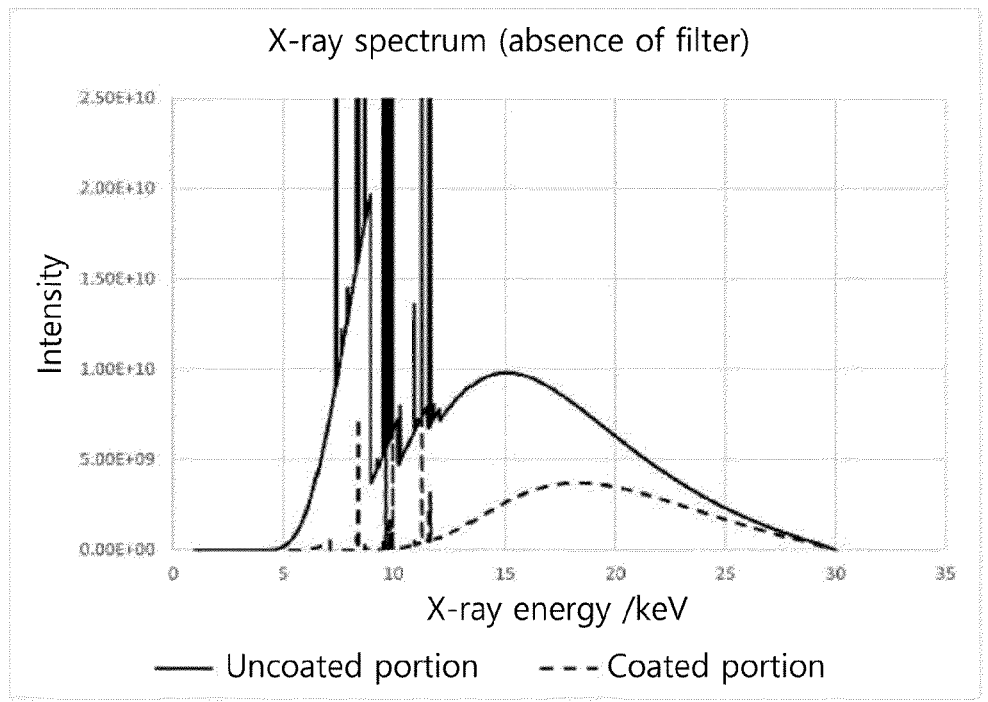
FIG. 9A is a graph of simulation of an X-ray spectrum illustrating energy intensity of the X-rays that passed through the coated portion and the uncoated portion compared with each other when the filter is not present in the X-ray inspection apparatus and the method of inspection with X-rays according to the present disclosure.
Figure 9B:
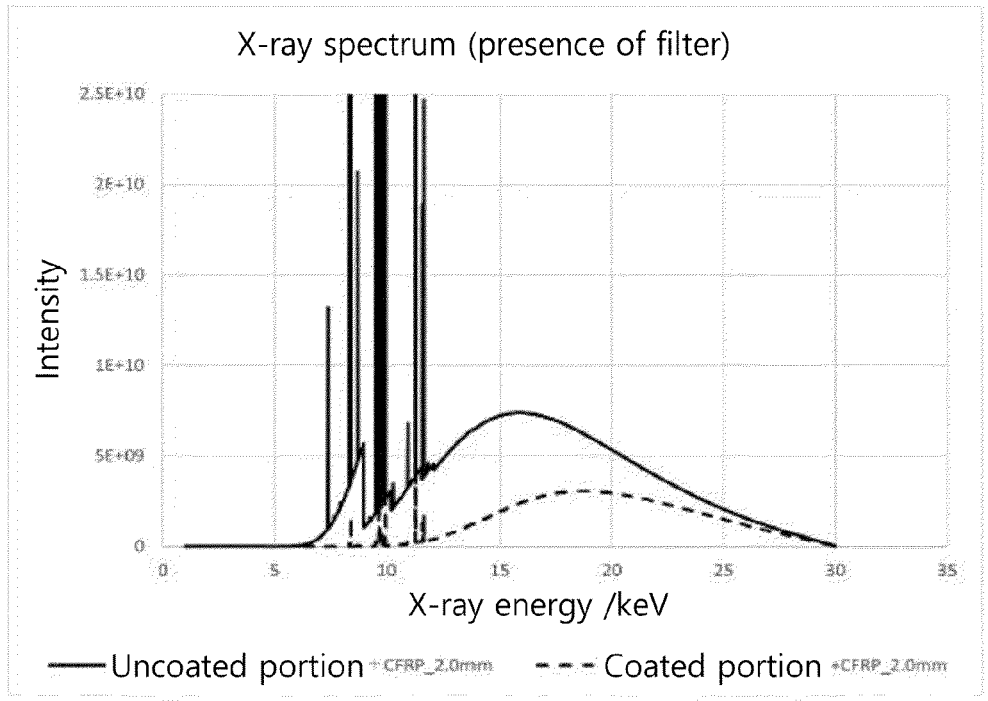
FIG. 9B is a graph of simulation of an X-ray spectrum illustrating energy intensity of the X-rays that passed through the coated portion and the uncoated portion compared with each other when the filter is present in the X-ray inspection apparatus and the method of inspection with X-rays according to the present disclosure.

FIGS. 9A and 9B illustrate the result of simulating the luminance of an X-ray spectrum illustrating energy intensity of X-rays that passed through the coated portion and the uncoated portion compared with each other according to whether the filter is present in a case in which the X-ray inspection apparatus of the first embodiment is used.

In addition, as a material constituting the filter, CFRP with a thickness of 2 mm is used, and the coated portion and the uncoated portion of the cathode material are inspected.

As a result, the ratio of the brightness of the uncoated portion to the coated portion is 3.5 when no filter is used, whereas the ratio of the brightness of the uncoated portion to the coated portion decreases to 2.5 when the filter is used in the X-ray inspection apparatus and the method of inspection with X-rays of the present disclosure. Accordingly, it can be seen that it is possible to suppress saturation of the luminance of the uncoated portion.

More specifically, the coated portion of the cathode material is difficult for an X-ray to pass through and tends to have transmittance as low as transmittance of X-rays of a low energy that passed through a general material, and thus is the region with a large amount of X-ray absorption. Because of this, as illustrated in FIG. 9A, even when no filter is used, the spectrum of X-rays that passed through the coated portion has significantly decreased at a low energy side.

In response, since when a filter is used, transmittance of X-rays tends to drop significantly in both the coated portion and the uncoated portion as much as at the low energy side, the intensity of X-rays at the low energy side changes significantly in the uncoated portion, and in the coated portion, the intensity of X-rays is originally low, so difference between the intensities of X-rays that passed through the coated portion and the uncoated portion is small. Accordingly, by placing the filter, the intensity ratio of X-rays that passed through the uncoated portion to X-rays that passed through the coated portion decreases.

The technical scope of the present disclosure is not limited to the above embodiments, and various changes may be made without departing from the spirit of the present disclosure.

In addition, each of the embodiments, the sample having the coated portion and the uncoated portion of the cathode material is inspected, and it is possible to perform an X-ray inspection by the X-ray inspection apparatus and the method of inspection with X-rays of the present disclosure for a sample having the region with a small amount of X-ray absorption and the region with a large amount of X-ray absorption formed to be thick with the same material as the region with a small amount of X-ray absorption.

What is claimed is:

1. An X-ray inspection apparatus comprising:
an X-ray source that irradiates a sample with X-rays;
an X-ray detection unit that is installed on a side opposite to the X-ray source with respect to the sample and detects the X-rays that passed through the sample; and
a filter installed between the X-ray source and the X-ray detection unit, wherein the sample has a region with a large amount of X-ray absorption and a region with a small amount of X-ray absorption and
the filter is formed of a material that makes an intensity ratio between an X-ray that passed through the region with a large amount of X-ray absorption and an X-ray that passed through the region with a small amount of X-ray absorption smaller than when the filter is not installed.

2. The X-ray inspection apparatus of claim 1, wherein the sample has a region with a large amount of X-ray absorption and a region with a small amount of X-ray absorption in a specific energy band of the X-rays with which the sample is irradiated and
the filter is formed of a material that makes absorption of X-rays of the specific energy band greater than absorption of X-rays of other energy bands.

3. The X-ray inspection apparatus of claim 1, wherein the sample has an uncoated portion that is a region where a base material is exposed and an amount of X-ray absorption is small and a coated portion that is a region where a material different from the base material is applied on the base material and an amount of X-ray absorption is large.

4. The X-ray inspection apparatus of claim 1, wherein the sample is of a flexible film shape and
the filter is placed in close contact with the sample between the X-ray source and the X-ray detection unit.

5. The X-ray inspection apparatus of claim 4, wherein the filter is placed on each of both surfaces of the sample with the sample being in between.

6. The X-ray inspection apparatus of claim 4, further comprising:
a sample moving mechanism that continuously moves the sample of a band shape in an extension direction of the sample,
wherein the sample moving mechanism is provided with a roller member rotatable while the sample is in contact with a portion of an outer circumferential surface of the roller member,
the X-ray source is disposed inside or outside the roller member,
the X-ray detection unit is installed on a side opposite to the X-ray source with respect to a portion of the sample in contact with the outer circumferential surface of the roller member, and
the roller member is the filter.

7. A method of inspection with X-rays comprising:
irradiating a sample with X-rays from an X-ray source; and
detecting the X-rays that passed through the sample with an X-ray detection unit installed at a side opposite to the X-ray source with respect to the sample,
wherein a filter is installed between the X-ray source and the X-ray detection unit,
the sample has a region with a large amount of X-ray absorption and a region with a small amount of X-ray absorption, and
the filter is formed of a material that makes an intensity ratio between an X-ray that passed through the region with a large amount of X-ray absorption and an X-ray that passed through the region with a small amount of X-ray absorption smaller than when the filter is not installed.

* * * * *